D. B. Conover,

Harrow.

No. 110,344. Patented Dec. 20, 1870.

Witnesses.
Jos. L. Coombs
H. L. Coombs.

Inventor
Daniel B. Conover

United States Patent Office.

DANIEL B. CONOVER, OF NEW BEDFORD, NEW JERSEY.

Letters Patent No. 110,344, dated December 20, 1870.

IMPROVEMENT IN HARROWS.

The Schedule referred to in these Letters Patent and making part of the same.

*To all whom it may concern:*

Be it known that I, DANIEL B. CONOVER, of New Bedford, in the county of Monmouth and State of New Jersey, have invented a new and useful Improvement in Harrows; and I do hereby declare that the following is a full, clear, and exact description thereof, reference being had to the accompaing drawing.

My invention consists, first, in constructing a harrow in four or more sections, and so hanging said sections together that the harrow will conform itself to any unevenness of the ground over which it is passing, by yielding thereto both longitudinally and transversely, and so that the principal sections can rise or be lifted to pass over obstructions independently of each other; and It consists, secondly, in so arranging the draft of the harrow divided into sections, longitudinally, said lateral sections being unconnected, except by a single hinge-joint in front, that the draft will prevent the said lateral sections from spreading apart, as hereinafter described.

In the accompanying drawing—

Figure 1:
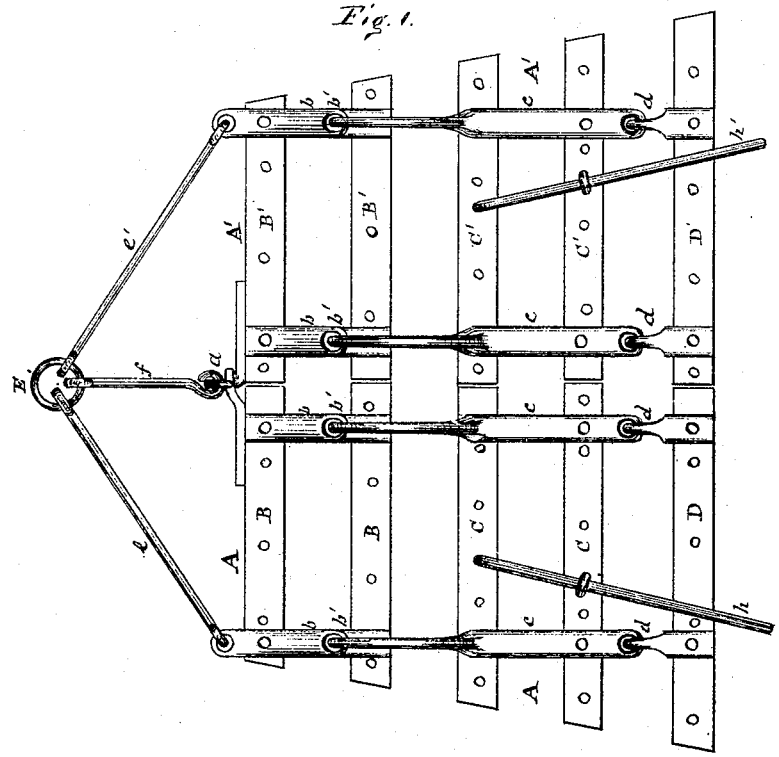
Figure 2:
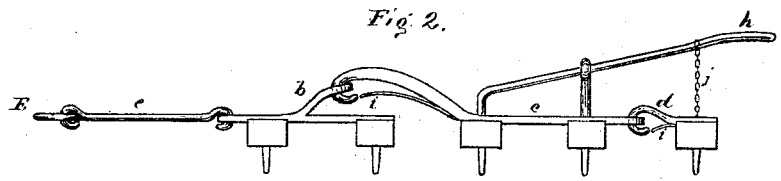

Figure 1 represents a plan or top view of a harrow made in pursuance of my invention; and Figure 2 represents a side view of the same.

The harrow is divided, longitudinally, into two sections, A and A', and these sections are hinged together at $a$, but unconnected at all other points.

The said sections A and A' are divided, transversely, into two or more sections, B B', C C', and D D'.

The front sections B and B' consist, each, of two tooth-bars, rigidly attached together by cross-bars $b$.

The sections C and C' consist, each, in like manner, of two tooth-bars, which are also rigidly attached together by cross-bars $c$, and the said sections C and C' are attached to the said sections B and B' by flexible hinged connections $b'$. The said sections B and B' and C and C' may each or either of them consist of three or more tooth-bars, rigidly attached together, if desired.

The sections D and D' are attached to the sections C and C' by hooks and eyes, at $d$ $d$, or by any other suitable hinged and flexible connection, easily attachable and detachable, so that said sections may be readily attached to or detached from the harrow, to increase or diminish its length. These sections may also each consist of two or more tooth-bars, rigidly attached together, if deemed expedient; and additional attachable and detachable sections may be provided, in like manner, if desired.

The hinged connections between the sections B and C and the sections B' and C' are elevated a'ove the top of the harrow, as shown in fig. 2, so that the tendency of the upward direction of the draft to raise the rear portions of said sections B and B' will be counteracted by the drag of the said sections C and C' in the rear. These connections are also made in the form of hooks and eyes, and are detachable for the purpose of more conveniently transporting or storing the harrow.

The hooks are provided with springs, $i$, like an ordinary snap-hook, to prevent accidental detachment in working. I do not, however, limit myself to this particular form of hinged connection, as any detachable and flexible joint will answer the purpose.

The sections C and D and C' and D' are provided with handles $h$ and $h'$, for the purpose of lifting them to pass over obstructions, or of clearing the teeth of any clogging matter.

The sections D and D' are attached to the said handles by slack chains or cords, $j$, to prevent said sections from lopping down when the handles are raised.

The draft is from three rods, $e$ and $e'$, linked or hooked to the front corners, and $f$, to the center of the harrow, and all connecting in a common ring or link, E.

The central rod $f$ links to the central hinge-joint $a$, and, consequently, the central draft is equal upon the inner front corners of the main sections A and A', and this effectually prevents the said sections from spreading apart through the center, though wholly unconnected except by the hinge-joint $a$ in front.

It will be seen that the sections C and C' are not immediately connected together, being only connected remotely, by means of the hinged joint $a$, and so either of said sections can rise or be lifted, to pass over an obstruction, independently of the other. The same is true in respect to the detachable sections D and D', or any additional detachable sections that may be provided.

Having thus fully described my invention and its mode of operation, I do not claim a harrow made in sections and hinged together longitudinally or transversely, or both; but

What I do claim as my invention, and desire to secure by Letters Patent, is—

1. A harrow divided into sections longitudinally and transversely, and said sections so united by hinged connections that they will yield to any unevenness of the ground independently of each other, and so that, through the center, longitudinally, said sections will be wholly unconnected except by a single hinged joint in front, substantially as described.

2. In combination with a harrow divided longitudinally into hinged sections, a draft from the center and the two forward corners, substantially as and for the purpose described.

DANIEL B. CONOVER.

Witnesses:
JOS. L. COOMBS,
C. L. COOMBS.